(12) United States Patent
Valentino (10) Patent No.: US 7,541,684 B1
(45) Date of Patent: Jun. 2, 2009

(54) SYSTEMS FOR GENERATING USEFUL ENERGY FROM VEHICLE MOTION

(76) Inventor: Joseph A. Valentino, 230 Sycamore Mills Rd., Media, PA (US) 19063

( * ) Notice: Subject to any disclaimer, the term of this patent is extended or adjusted under 35 U.S.C. 154(b) by 12 days.

(21) Appl. No.: 11/984,799

(22) Filed: Nov. 21, 2007

(51) Int. Cl.
*F03G 3/00* (2006.01)
*H02K 7/00* (2006.01)

(52) U.S. Cl. ..................... 290/1 R
(58) Field of Classification Search ............. 290/1 R
See application file for complete search history.

(56) References Cited

U.S. PATENT DOCUMENTS

| | | | |
|---|---|---|---|
| 3,885,163 A | 5/1975 | Toberman | |
| 4,081,224 A | 3/1978 | Krupp | |
| 4,173,431 A | 11/1979 | Smith | |
| 4,211,078 A | 7/1980 | Bass | |
| 4,212,598 A * | 7/1980 | Roche et al. | 417/229 |
| 4,238,687 A | 12/1980 | Martinez | |
| 4,239,974 A | 12/1980 | Swander et al. | |
| 4,239,975 A | 12/1980 | Chiappetti | |
| 4,247,785 A * | 1/1981 | Apgar | 290/1 R |
| 4,250,395 A | 2/1981 | Lundgren | |
| 4,322,673 A | 3/1982 | Dukess | |
| 4,339,920 A | 7/1982 | Le Van | |
| 4,409,489 A | 10/1983 | Hayes | |
| 4,418,542 A | 12/1983 | Ferrell | |
| 4,437,015 A | 3/1984 | Rosenblum | |
| 4,614,875 A | 9/1986 | McGee | |
| 4,739,179 A | 4/1988 | Stites | |
| 5,355,674 A | 10/1994 | Rosenberg | |
| 5,634,774 A | 6/1997 | Angel et al. | |
| 6,204,568 B1 | 3/2001 | Runner | |
| 6,353,270 B1 | 3/2002 | Sen | |
| 6,362,534 B1 | 3/2002 | Kaufman | |
| 6,376,925 B1 | 4/2002 | Galich | |
| 6,756,694 B2 | 6/2004 | Ricketts | |
| 6,767,161 B1 | 7/2004 | Calvo et al. | |
| 6,858,952 B2 | 2/2005 | Gott et al. | |
| 6,949,840 B2 * | 9/2005 | Ricketts | 290/1 R |
| 7,067,932 B1 | 6/2006 | Ghassemi | |
| 7,102,244 B2 | 9/2006 | Hunter, Jr. | |
| 2004/0012202 A1 | 1/2004 | Dobbs, Sr. | |
| 2004/0042852 A1 | 3/2004 | Alperon | |
| 2006/0119102 A1 * | 6/2006 | Hershey et al. | 290/1 R |
| 2007/0085342 A1 * | 4/2007 | Horianopoulos et al. | 290/1 R |

FOREIGN PATENT DOCUMENTS

| | | | |
|---|---|---|---|
| DE | 3235788 A * | 3/1984 | |
| DE | 3717893 A1 * | 12/1988 | |

(Continued)

*Primary Examiner*—Joseph Waks
(74) *Attorney, Agent, or Firm*—Finnegan, Henderson, Farabow, Garrett & Dunner, LLP (57) ABSTRACT

A system for generating useful energy from vehicle motion. The system includes: a projection projecting above a road surface, pivotably mounted to the road surface to be pushed downward against an upward bias, by a vehicle tire passing over an upper surface of the projection; a master fluid cylinder mechanically linked to the projection; a fluid transfer device connected to the master fluid cylinder; a secondary fluid cylinder, communicating with the master fluid cylinder via the fluid transfer device; and a lever configured to transfer motion from the secondary fluid cylinder to a flywheel shaft, the flywheel shaft having a distal end coupled to an electric generator.

21 Claims, 7 Drawing Sheets

FOREIGN PATENT DOCUMENTS

| | | | |
|---|---|---|---|
| FR | 2823262 A1 | * | 10/2002 |
| GB | 2 275 828 A | | 9/1994 |
| GB | 2290115 A | * | 12/1995 |
| JP | 56044469 A | * | 4/1981 |
| JP | 09224355 A | * | 8/1997 |
| JP | 2001153030 A | * | 6/2001 |
| JP | 2004324628 A | * | 11/2004 |

* cited by examiner

SYSTEMS FOR GENERATING USEFUL ENERGY FROM VEHICLE MOTION

FIELD OF THE INVENTION

In general, the present disclosure relates to the generation of useful energy from vehicle motion, and more specifically, to systems for converting vehicle motion into rotation of an off-road flywheel shaft connected to an electric generator.

BACKGROUND OF THE INVENTION

Recently, countries around the world have become more sensitive to the effects of releasing pollutants, such as carbon monoxide, carbon dioxide, and nitrogen dioxides, into the air. Moreover, countries are struggling to prepare for the expected depletion of the world's petroleum supply and the resulting price inflation of various fossil fuels. Because of this, there has been an increased emphasis on the development and refinement of "renewable" and alternative sources of energy. For example, the collection and conversion of naturally occurring solar and wind energy has long been pursued. Devices such as photovoltaic cells and windmills have been engineered over several decades; however, their limited maximum output often makes them prohibitively expensive. Accordingly, lesser known methods have also been developed to recapture waste energy from existing industrial processes and other collateral sources of energy.

For example, various systems and methods have been developed for recapturing energy from the motion of moving vehicles. Many of these systems have involved the use of multiple projections in the surface of the roadway. The projections are typically configured to actuate a system of linkages and gears below the surface of the roadway when a vehicle contacts and depresses the projections. For example, in some systems, a flywheel and flywheel shaft are disposed below the roadway. Mechanisms connected to the roadway projections are configured to rotate the flywheel shaft when actuated by a passing vehicle. These existing systems have several disadvantages.

First of all, existing systems require the installation of extensive combinations of mechanical gears and linkages below the roadway. Some systems even require the installation of sensitive electronics and other components below the roadway. Therefore, these systems are very difficult and expensive to install in existing roadways. They also greatly increase the cost of constructing new roadways. Moreover, because so many components are installed below the roadway, they may be easily damaged due to adverse weather, water damage, and the negative physical effects of heavy traffic. Accordingly, existing systems are extremely expensive to repair and maintain, in the event of both normal wear-and-tear and periodic component failure due to occasional, extreme impacts.

In addition, existing systems are generally energy-inefficient and insufficiently cost effective. Existing systems do not capture a significant amount of energy upon the impact of a passing vehicle, and they also suffer from other system-wide inefficiencies. The existing methods of energy conversion fail to fully exploit the potential of the captured energy to generate useful electrical energy. Thus, existing systems and methods provide relatively little energy output and therefore fail to sufficiently outweigh the costs of their installation, maintenance, and repair.

Accordingly it is a primary object of the invention to provide systems for generating substantial amounts of useful energy from the motion of passing vehicles, with the use of an off-road flywheel shaft and energy conversion box.

SUMMARY OF THE INVENTION

The advantages and purposes of the invention will be set forth in part in the description that follows, and in part will be obvious from the description, or may be learned by practice of the invention. Moreover, the advantages and purposes of the invention will be realized and attained by means of the elements and combinations particularly pointed out in the appended claims.

The invention provides a system for generating useful energy from vehicle motion. The system includes: a projection projecting above a road surface, pivotably mounted to the road surface to be pushed downward against the bias of a spring, by a vehicle tire passing over an upper surface of the projection; a master fluid cylinder mechanically linked to the projection; a fluid transfer device connected to the master fluid cylinder; a secondary fluid cylinder, communicating with the master fluid cylinder via the fluid transfer device; and a lever configured to transfer motion from the secondary fluid cylinder to a flywheel shaft, said flywheel shaft having a distal end coupled to an electric generator.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings are incorporated in and constitute a part of this specification to provide a further understanding of the invention. The drawings illustrate one embodiment of the invention and together with the description, serve to explain the principles of the invention.

DESCRIPTION OF THE EMBODIMENTS

Reference will now be made in detail to the presently preferred embodiment of the invention, an example of which is illustrated in the accompanying drawings. Wherever possible, the same reference numbers will be used throughout the drawings to refer to the same or like parts.

Figure 1:
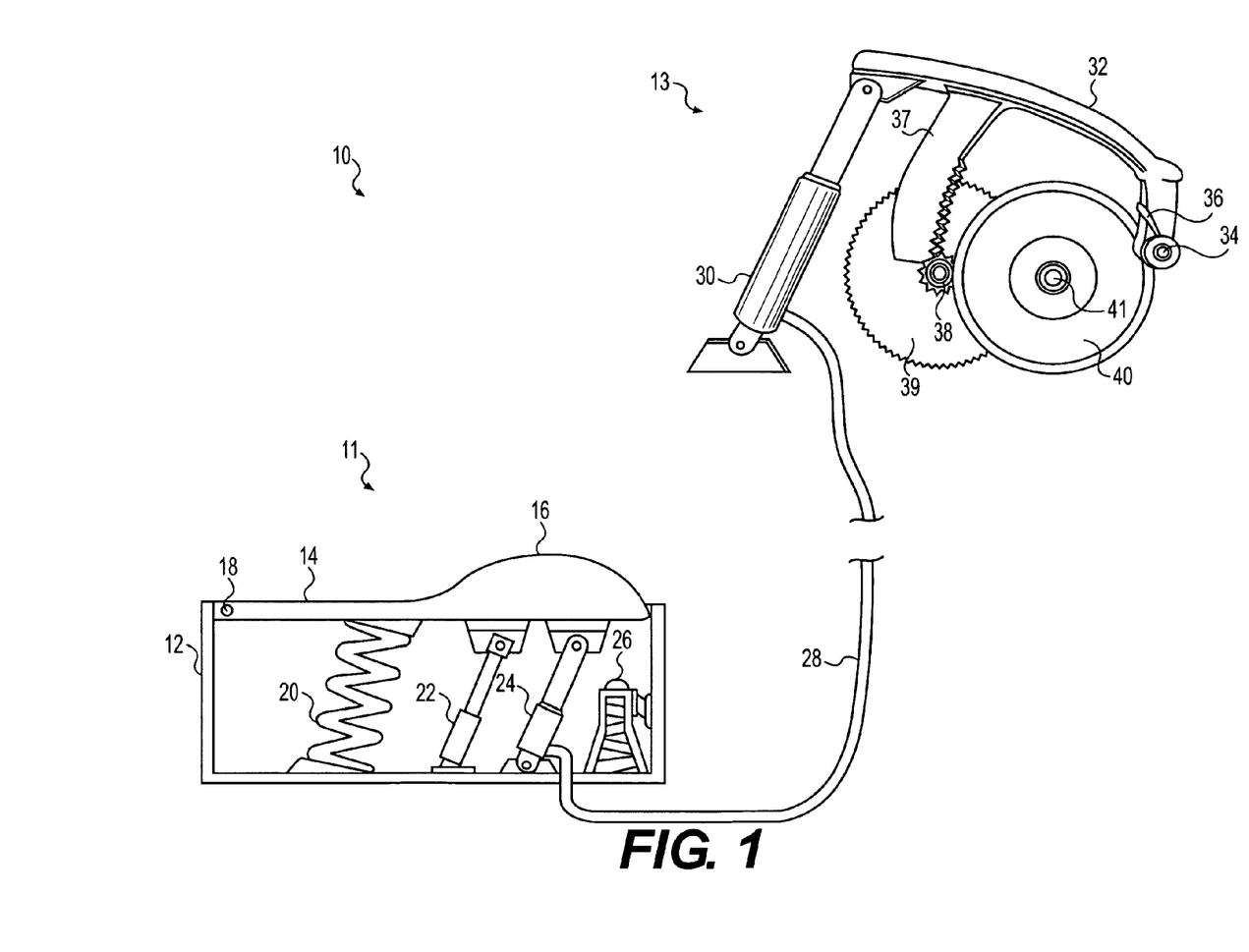
FIG. 1 is a side view representation of a portion of a preferred embodiment of a system for generating useful energy from vehicle motion.

Referring to FIG. 1, a preferred embodiment is disclosed including a system 10 for generating useful energy from vehicle motion generally includes a master fluid cylinder and tiger pawl assembly 11 and a secondary cylinder and lever assembly 13.

The master fluid cylinder and tiger pawl assembly 11 preferably includes an underground box 12 that is configured to be installed below the surface of a roadway. The underground box 12 preferably is made out of approximately ½ to ¾ inch steel plate, or any other material sufficiently strong and resilient to support the cyclical loading of various vehicle weights. The underground box 12 has an upper surface including a movable plate, or tiger pawl 14, that is generally flush with the roadway around its periphery. The tiger pawl 14 has a projection 16 that protrudes above the road surface, below which the underground box 12 is installed. As depicted in the illustrated embodiment, the tiger pawl 14 is mounted to the underground box 12 at one end by a tiger pawl pivot 18. At another end, the tiger pawl 14 is mechanically coupled to the underground box 12 by a shock absorber 22 and a master fluid cylinder 24. Midway along the length of the tiger pawl 14, the tiger pawl 14 is mechanically coupled to the underground box 12 by a return spring 20. Specifically, the return spring 20, shock absorber 22, and master fluid cylinder 24 are mounted to the bottom of the underground box 12 and extend upwards where they couple to the tiger pawl 14 generally adjacent to the plane of the road surface. The return spring 20 and shock absorber 22 are configured to transfer the entire weight of a vehicle when the tiger pawl 14 is being depressed downwards by a passing vehicle. The underground box 12 supports the weight of the vehicle when tiger pawl 14 is flush with or below the road surface. Nevertheless, an overthrow stop 26 may be disposed at an end of the underground box 12 to prevent the undesired over-pivoting of the tiger pawl 14, for example, in the event that a substantially overweight vehicle traverses the tiger pawl 14.

When a vehicle passing over the tiger pawl 14 contacts the projection 16, the resulting impact causes the tiger pawl 14 to rotate clockwise about the tiger pawl pivot 18 such that the tiger pawl 14 compresses the master fluid cylinder 24. The master fluid cylinder 24 contains a hydraulic fluid that, upon depression of the tiger pawl 14, is urged at a relatively increased pressure into a fluid transfer device 28. The fluid transfer device 28 is configured to convey the pressurized hydraulic fluid to the secondary cylinder and lever assembly 13. Specifically, the master fluid cylinder 24 causes the hydraulic fluid to pass through the fluid transfer device 28 and actuate a secondary fluid cylinder 30 in the secondary cylinder and lever assembly 13.

The secondary cylinder and lever assembly 13 preferably includes a flywheel pull lever 32 mechanically coupled to the secondary fluid cylinder 30 and a flywheel pull lever pivot 34. As depicted in the illustrated embodiment, the flywheel pull lever 32 is biased in a clockwise direction by a return spring 36. Flywheel pull lever 32 includes a flywheel pull lever rack gear 37, which is configured to engage a set of flywheel gears comprising the secondary cylinder and lever assembly 13. Specifically, flywheel pull lever rack gear 37 includes teeth that engage a small flywheel drive gear 38. The small flywheel drive gear 38 is either fixedly attached to, or integral with, a concentrically-aligned large flywheel drive gear 39. The large flywheel drive gear 39 is configured to engage a flywheel 40, which in turn rotates about a flywheel shaft 41 that ultimately communicates with an electric generator, as will be described below.

Figure 2:
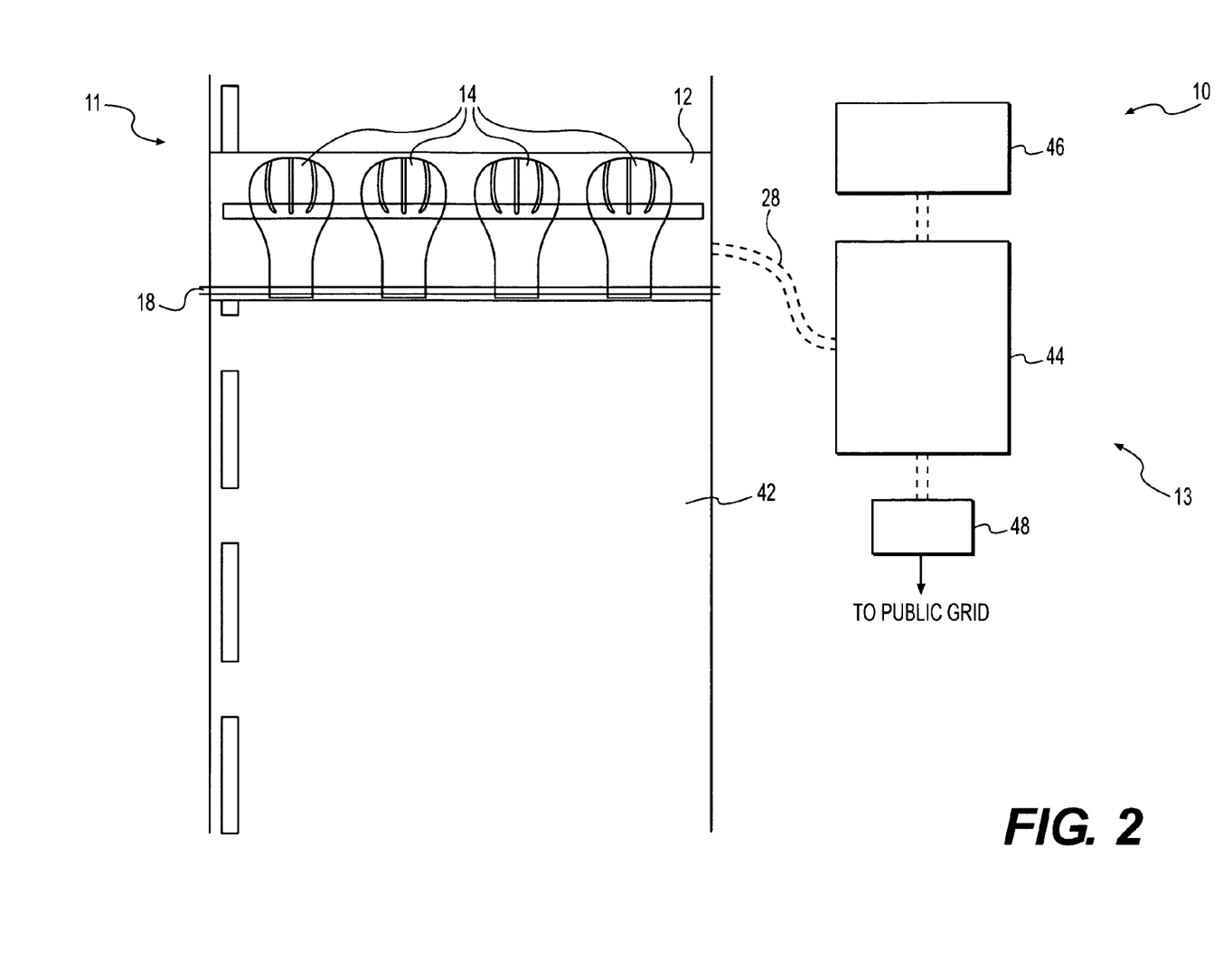
FIG. 2 is a top view representation of a preferred embodiment of a system for generating useful energy from vehicle motion.

In order to better understand an exemplary physical arrangement of the system, FIG. 2 illustrates a top view of the system 10 as installed in a roadway 42. Specifically, an underground box 12 includes a plurality of tiger pawls 14 disposed linearly across a lane of the roadway 42. As broadly embodied in FIG. 1, the tiger pawls 14 are configured to rotate about the tiger pawl pivot 18, when impacted by vehicles that traverse them. In the depicted embodiment, the underground box 12 includes four tiger pawls 14; however, as will be appreciated by one of skill in the art, the underground box 12 may include any number of tiger pawls 14. Alternatively, the underground box 12 may include only a single tiger pawl 14 that is wide enough to be impacted by both wheels of one or more vehicles traveling on the roadway.

FIG. 2 also illustrates the underground box 12 being connected to an off-road box 44 by the fluid transfer device 28. The off-road box 44 preferably includes the secondary cylinder and lever assembly 13, and any other related components, as will be described in greater detail below. As depicted, the off-road box 44 preferably is also connected to an alternative energy generation system 46 and an electric public grid meter 48. The electric public grid meter 48 is configured to be in communication with the public electrical grid. Alternatively, the alternative energy generation system 46 and/or electric public grid meter 48 also may be disposed inside the off-road box 44, if desired.

Figure 3A:
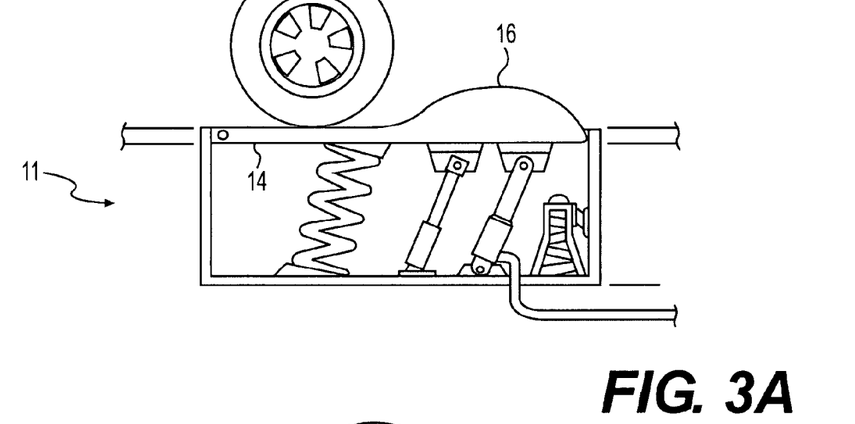
FIGS. 3A-3C illustrate successive stages of a vehicle engaging a preferred embodiment of a system for generating useful energy from vehicle motion.
Figure 3B:
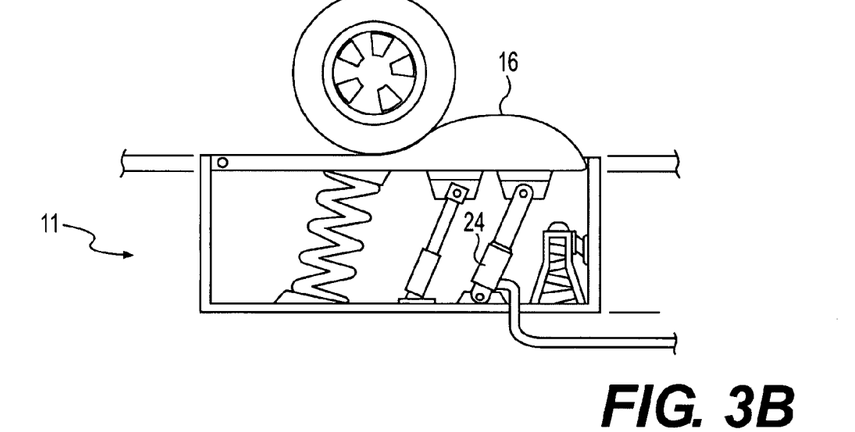
Figure 3C:
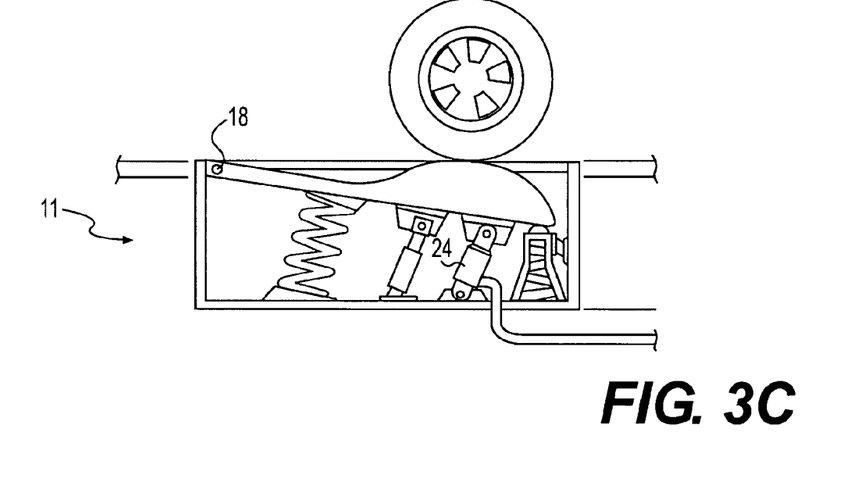

FIGS. 3A-3C illustrate the successive stages of a vehicle tire impacting the preferred master fluid cylinder and tiger pawl assembly 11, as positioned in a roadway. Specifically, FIG. 3A illustrates a vehicle wheel contacting an initial portion of the tiger pawl 14. As depicted in this embodiment, this initial portion may be relatively flush and co-planar with the road surface. However, in an alternative embodiment, the initial portion of the tiger pawl may be gradually sloped upwards toward the projection 16. For example, there may be a 30 degree incline along the tiger pawl 14 such that the tiger pawl 14 experiences a gradual rotational acceleration as soon as it is contacted by a vehicle wheel. This would avoid an overly-sudden impact with the projection 16. FIG. 3B illustrates the vehicle wheel as it initially contacts the projection 16. In this illustrated embodiment, where the initial portion of the tiger pawl 14 is co-planar with the roadway, the first contact with the projection 16 is an impact that begins an immediate acceleration of the tiger pawl 14, and compression of the master fluid cylinder 24. FIG. 3C illustrates the vehicle wheel fully impacting and passing over the projection 16, such that the tiger pawl 14 is depressed downwards, and rotated clockwise about the tiger pawl pivot 18. As illustrated in FIG. 3C, this impact causes the master fluid cylinder 24 to be relatively compressed, or actuated.

Figure 4A:
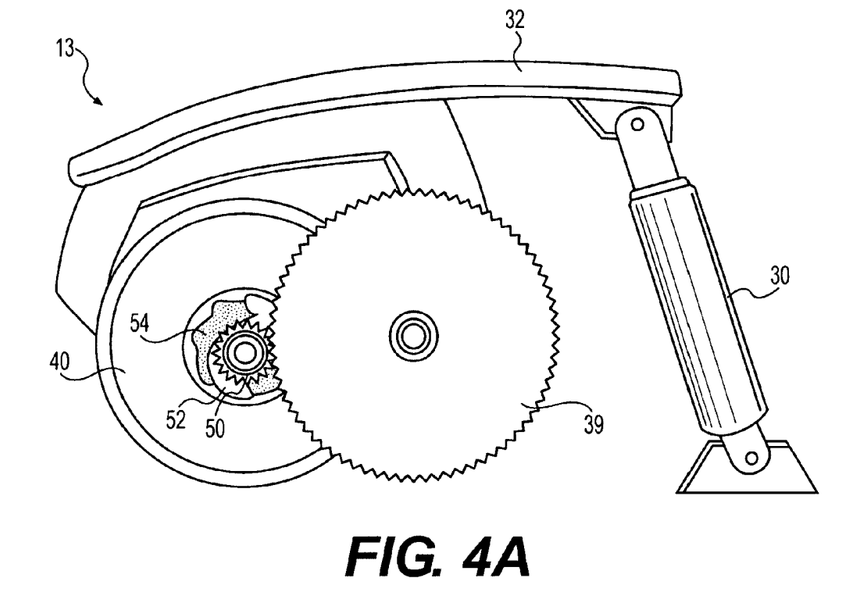
FIG. 4A illustrates a side view of a preferred embodiment of a secondary fluid cylinder and flywheel consistent with the present invention.
Figure 4B:
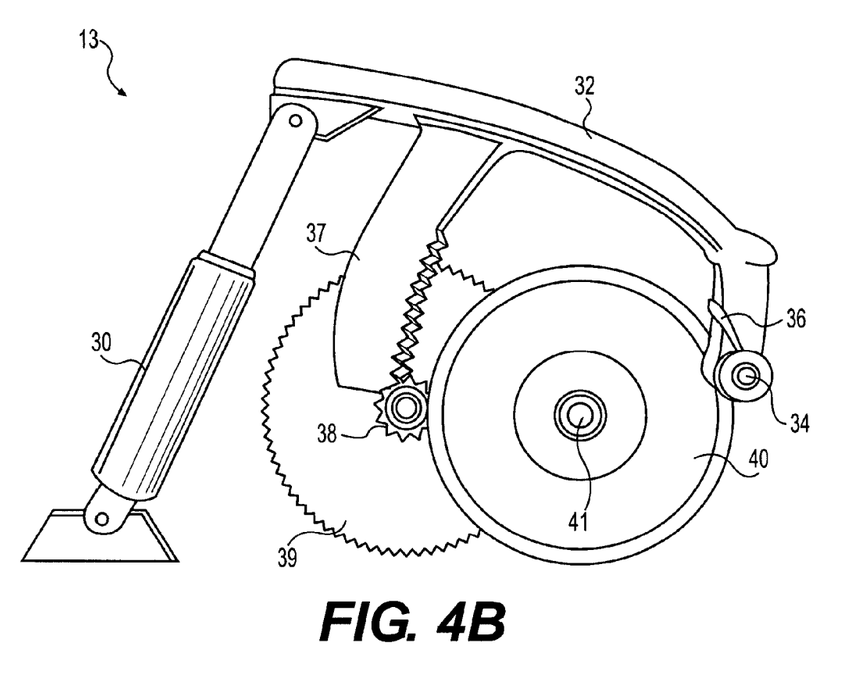
FIG. 4B illustrates an alternative side view of a preferred embodiment of a secondary fluid cylinder and flywheel consistent with the present invention.

FIGS. 4A and 4B illustrate opposite sides of an exemplary embodiment of the secondary cylinder and lever assembly 13. As described with respect to FIG. 1, the secondary fluid cylinder 30 of assembly 13 is actuated upon a vehicle's depression of the master fluid cylinder 24 and a resulting flow of hydraulic fluid through the fluid transfer device 28. In a preferred embodiment, the secondary fluid cylinder 30 is a "pull-type" cylinder, requiring approximately 50 pounds of fluid pressure to be compressibly actuated. FIG. 4A depicts the secondary fluid cylinder 30 in a compressed, or pulled, state. Conversely, FIG. 4B depicts the secondary fluid cylinder 30 in an extended, steady state, as biased in a clockwise direction by a rotational return spring 36.

Referring to FIG. 4B, when the secondary fluid cylinder 30 is actuated, it causes the flywheel pull lever 32 to rotate counter-clockwise about the flywheel pull lever pivot 34, against the bias of return spring 36. As the flywheel pull lever 32 rotates counter-clockwise, the flywheel pull lever rack gear 37 moves downward such that its teeth engage and rotate the small flywheel drive gear 38. As a result, the large flywheel drive gear 39 rotates at generally the same angular velocity, and accordingly engages and rotates a flywheel pawl gear 50, as depicted in FIG. 4A. The flywheel pawl gear 50 is fixedly attached to, or integral with, a flywheel pawl assembly 52. The flywheel pawl assembly 52 is configured to selectively engage and rotate into a set of flywheel ratchet teeth 54, which are fixedly attached to, or integral with, the flywheel 40. Thus, the flywheel 40 is urged to rotate with the flywheel shaft 41 at a certain angular velocity, depending on the rate of travel of the flywheel pull lever rack gear 37, and the gear ratios between the small and large flywheel drive gears 38, 39 and the flywheel pawl gear 50.

When the secondary fluid cylinder 30 is allowed to return to its expanded, steady state (as shown in FIG. 4B), the flywheel pull lever 32 rotates clockwise about the flywheel pull lever pivot 34, as urged by the return spring 36. As the flywheel pull lever 32 rotates clockwise, the flywheel pull lever rack gear 37 moves upward, thereby reversing the rotation of the small and large flywheel drive gears 38, 39, and the flywheel pawl gear 50. More importantly, this return stroke of the flywheel pull lever rack gear 37 causes the flywheel pawl assembly 52 to be flung inward by centrifugal force, away from the flywheel ratchet teeth 54. Accordingly, the angular rotation of the flywheel ratchet teeth 54 and the flywheel 40 is not interrupted by the return stroke, and the flywheel 40 is allowed to rotate with the flywheel shaft 41, undisturbed by gears rotating in the opposite direction. Moreover, each actuation of the secondary fluid cylinder 30 (as caused by vehicular impact of the projection 16 and master fluid cylinder 24) is able to positively contribute to the rotation of the already rotating flywheel shaft 41.

Although the secondary cylinder and lever assembly 13 is described as including a "pull cylinder," any other suitable arrangement may be used to effect an equivalent, ratcheted rotation of the flywheel shaft 41. For example, one of skill in the art will appreciate that the secondary fluid cylinder 30 may alternatively be configured to expand, rather than contract, when actuated by hydraulic fluid pressurized by the master fluid cylinder 24.

Figure 5:
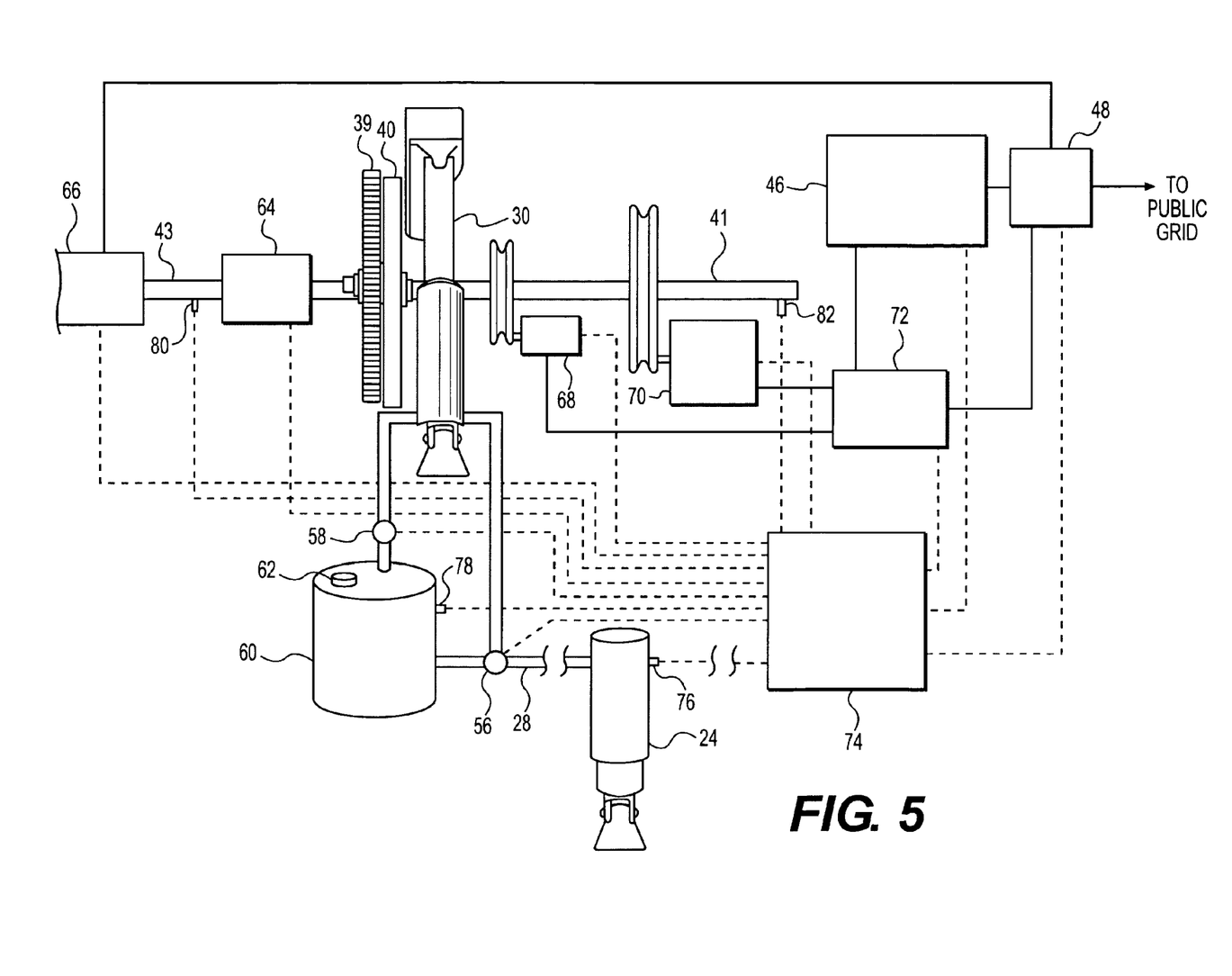
FIG. 5 is a system-wide representation of a preferred embodiment of a system for generating useful energy from vehicle motion.

FIG. 5 illustrates an exemplary embodiment of an overall system for generating useful energy from vehicle motion. As previously described with respect to FIG. 1, the system preferably includes a master fluid cylinder 24 in fluid communication with a secondary fluid cylinder 30, via a fluid transfer device 28. As illustrated in the exemplary embodiment of FIG. 5, the fluid transfer device 28 preferably includes a plurality of hoses, a first demand valve 56, a second demand valve 58, and a storage tank 60. A first hose may connect the master fluid cylinder 24 to the first demand valve 56. The first demand valve 56 may be configured to direct any proportion of hydraulic fluid through a second hose to the secondary fluid cylinder 30 or through a third hose to the storage tank 60. A fourth hose may be configured to convey hydraulic fluid from the storage tank 60 to the second demand valve 58, and a fifth hose may be configured to convey hydraulic fluid from the second demand valve 58 to the secondary fluid cylinder 30. Each of the first and second demand valves 56, 58 may be any suitable type of valve, such as a two- or three-way proportional valve or a butterfly valve. The fluid transfer device 28 also may include any number of check valves positioned throughout the hydraulic fluid flow path, as necessary to prevent the unwanted reverse flow of hydraulic fluid.

The storage tank 60 may be used to store compressed hydraulic fluid that has been generated by the master fluid cylinder 24 and metered by the first demand valve 56. This stored hydraulic fluid may then be released by the second demand valve 58 during certain circumstances, as will be described in greater detail with respect to FIG. 7. In some cases, the pressure inside the storage tank 60 may reach a certain maximum threshold, at which point, it is advantageously released into the atmosphere by a pop-off valve 62.

Depending on the flow of pressurized hydraulic fluid from one or both of the storage tank 60 and the master fluid cylinder 24 (as controlled by the first and second demand valves 56, 58), the secondary fluid cylinder 30 may be selectively actuated. The secondary fluid cylinder 30 may then effect a rotation of the flywheel shaft 41, via the large flywheel drive gear 39 and flywheel 40, among other things, as described with respect to FIGS. 4A-4B. Besides the master fluid cylinder 24 and the storage tank 60, auxiliary systems may be in place to contribute to the rotation of the flywheel shaft 41, in the event that the rate of vehicle traffic, and therefore the actuation rate of projection 16 and master fluid cylinder 24, decreases to a level insufficient for electric generation.

For example, as depicted in FIG. 5, the preferred system preferably includes an alternator 68 that collects the unused rotational energy of the flywheel shaft 41 and directs it to a battery 72. The battery 72 may then provide energy to a backup DC motor 70, which is configured to selectively rotate the flywheel shaft 41, as desired. The battery 72 may be any suitable type of rechargeable battery or group of batteries, including for example, lead-acid, lithium-ion, lithium ion polymer, nickel-cadmium, nickel metal hydride, or molten salt. The backup DC motor 70 may be any suitable type of motor, including for example, a brushed, brushless, or coreless DC motor. In one embodiment, the backup DC motor 70 has an efficiency of approximately 80%.

The battery 72 preferably also is in communication with an alternative energy generation system 46 and an electric public grid meter 48. The alternative energy generation system 46 is any type of system that provides an alternative source of energy for charging the battery 72, and thereby operating the backup DC motor 70. For example, the alternative energy generation system 46 may include: a plurality of photovoltaic cells, or any other solar energy collection device; a windmill or any other air-powered turbine operable by vehicle-generated air turbulence; or any other "renewable" or alternative energy source. The electric public grid meter 48 may be a 110-220 Volt electric meter connected to the public utility electric grid. Accordingly, the electric public grid meter 48 may "run forwards" so as to provide electricity from the public grid to the backup DC motor 70 or the battery 72. Alternatively, the electric public grid meter 48 may "run backwards" to direct excess electricity generated by the system to the electric grid.

Given some rotational input by one or more of the secondary fluid cylinder 30 (either by the master fluid cylinder 24 or the storage tank 60) and the backup DC motor 70 via battery 72 (as charged by the alternator 68, alternative energy generation system 46, and/or electric public grid meter 48), the rotation of the flywheel shaft 41 may then be adjusted by a gearbox 64 positioned between an electric generator 66 and the rest of the system. In one embodiment, the gearbox 64 preferably is a "step-up" gearbox that is configured to increase the angular velocity (i.e., the RPMs) of the flywheel shaft 41 before it reaches the electric generator 66. For example, given an initial flywheel speed of approximately 300-600 RPM, a "step-up" gearbox 64 may increase the flywheel speed to approximately 1200-1500 RPM. The electric generator 66 may then convert the rotational kinetic energy of the flywheel shaft 41, or gearbox shaft 43, into useful electric energy. For this purpose, the electric generator 66 may be any suitable type of electric generator, such as for example, either a single- or poly-phase AC electric generator, or a shunt, series, or compound-wound DC electric generator. The electric generator 66 may direct the generated electricity to any device, machine, or network; however, as illustrated in FIG. 5, the electric generator 66 preferably is connected at least to the electric public grid meter 48, whereby it may direct the generated electricity to the public utility electric grid.

As illustrated in FIG. 5, the exemplary system also preferably includes an electronic control unit (ECU) 74. In general, the ECU 74 may provide control logic and decision-making for the some or all of the components of the energy generation system. As broadly embodied in FIG. 5, the ECU 74 communicates with a first sensor 76, which is configured to detect a rate of actuations of the master fluid cylinder 24. The ECU 74 also communicates with a second sensor 78, which is configured to detect a fluid level of the storage tank 60. The ECU 74 also communicates with a third sensor 82, which is configured to detect a rotational speed of the flywheel shaft 41. The ECU 74 also communicates with a fourth sensor 80, which is configured to detect a rotational speed of a gearbox shaft 43. The ECU 74 also is configured to communicate with one or more of the first demand valve 56, the second demand valve 58, the electric generator 66, the gearbox 64, the alternator 68, the backup DC motor 70, the battery 72, the alternative energy generation system 46, and the electric public grid meter 48.

Figure 6:
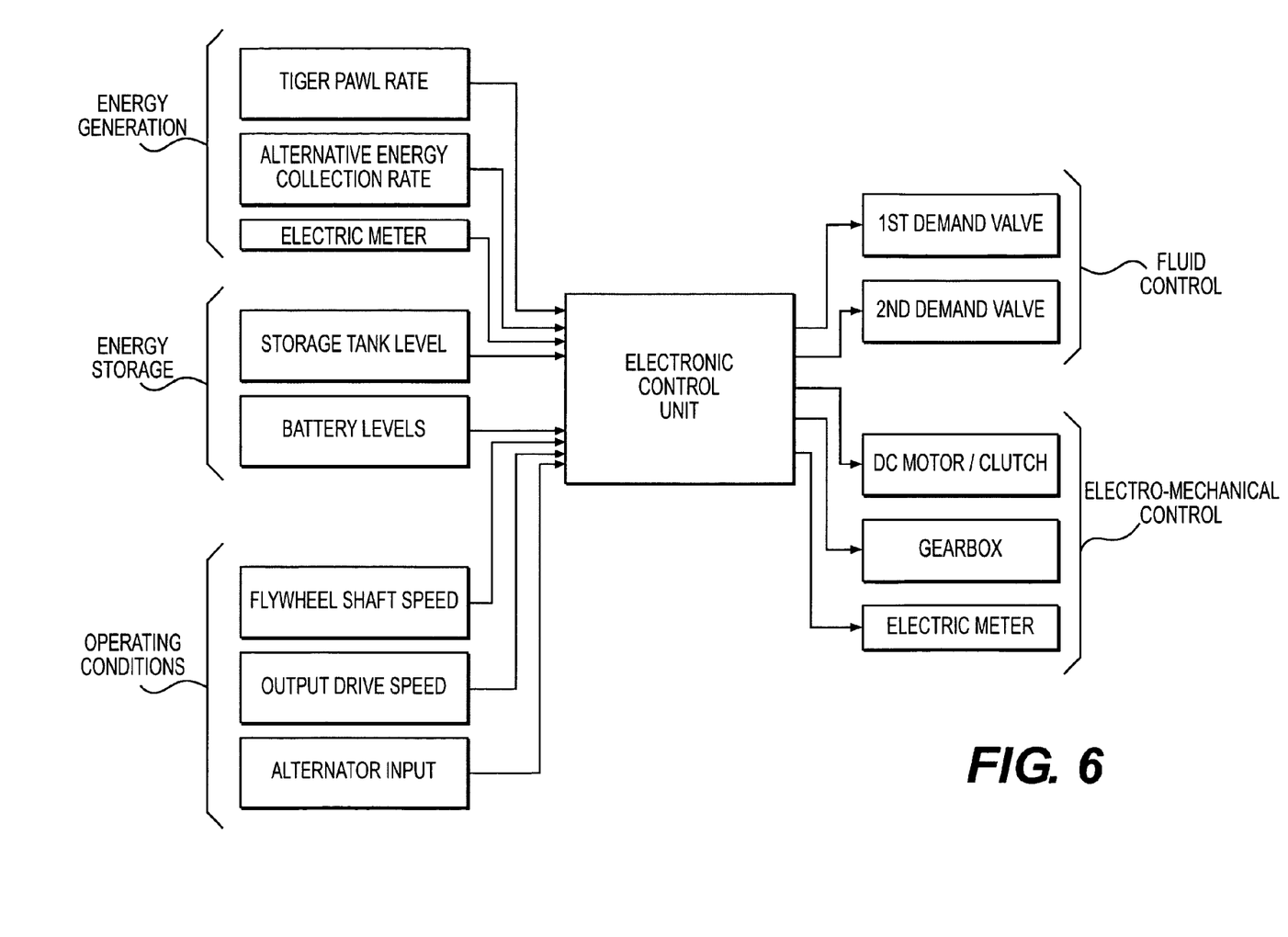
FIG. 6 is a block diagram illustrating a preferred embodiment for controlling the system for generating useful energy from vehicle motion of FIG. 5.

The operation of the ECU 74 may be better understood with reference to the block diagram of FIG. 6, which illustrates a preferred configuration for the flow of information through the ECU 74. First of all, the ECU 74 may receive information about the rate of incoming energy generation. Specifically, the ECU 74 may receive a tiger pawl pivot rate, for example from the first sensor 76. The ECU 74 also preferably receives information about the collection rate of the alternative energy generation system 46 and the electric public grid meter 48. Next, the ECU 74 may also receive information about the current levels of energy storage, such as levels of the storage tank 60 (from the second sensor 78) and levels of the battery 72. The ECU 74 also receives information about the current system operating conditions, such as the flywheel shaft speed (by the third sensor 82), the output drive speed (by the fourth sensor 80), and the input of the alternator 68.

The ECU 74 preferably is configured to receive such information, perform certain logic and decision-making operations, and then emit signals to components of the system to desirably control their functions. For example, the ECU 74 may exercise control over the hydraulic fluid flow by controlling the operation of the first demand valve 56 and the second demand valve 58. The ECU 74 also may control the operation of various mechanical and electric components, such as the backup DC motor 70 and any associated clutch, the gearbox 64, and the electric public grid meter 48. For example, the ECU 74 may operate a clutch to bring the backup DC motor 70 up to the speed of the rotating flywheel shaft 41. The configuration of FIG. 6 is only one possible embodiment for communicating with the ECU 74, and one of skill in the art will appreciate that other suitable arrangements are contemplated and within the scope of the present disclosure.

Figure 7:
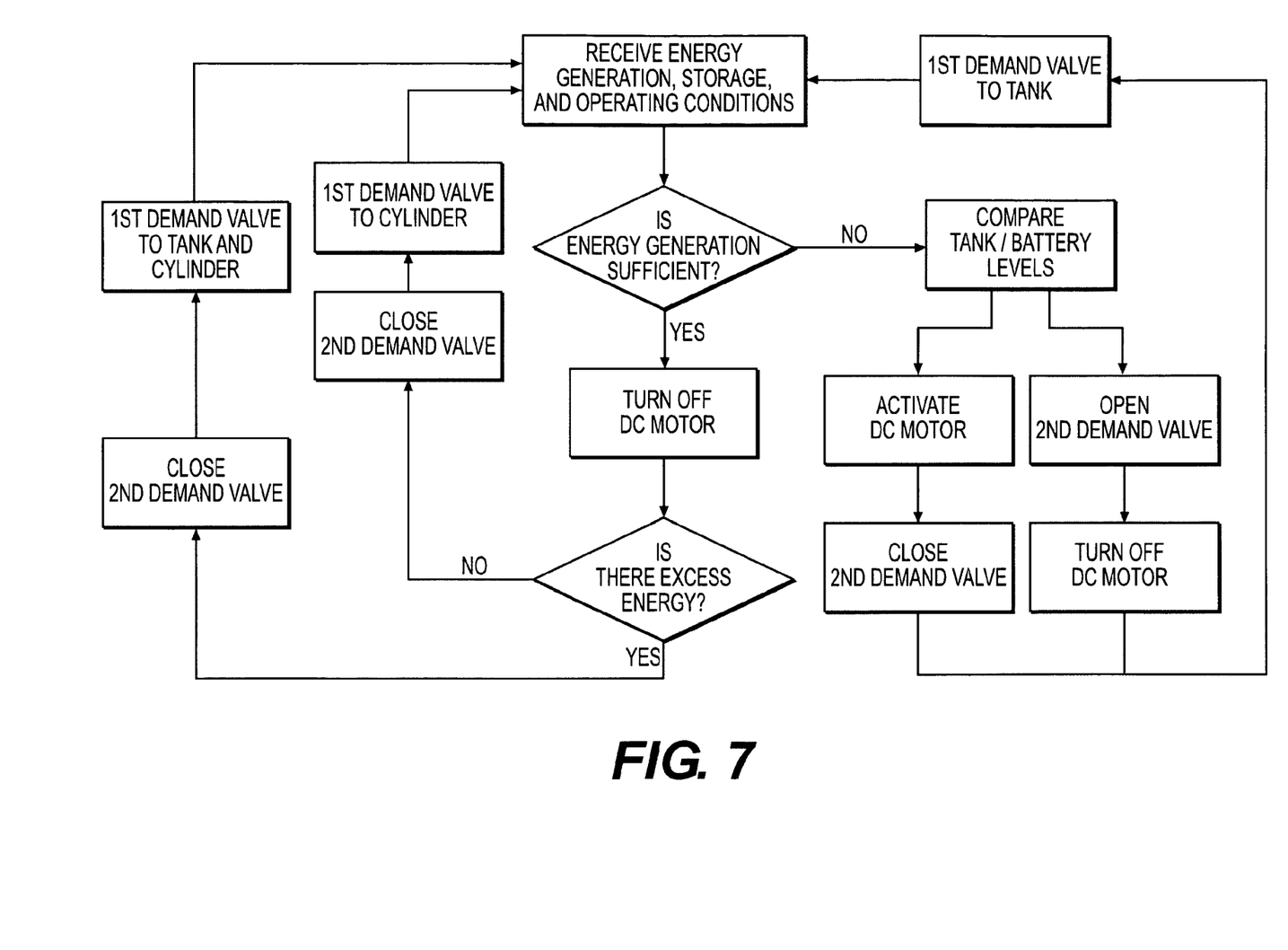
FIG. 7 is a flowchart illustrating a preferred embodiment for control decision-making in the system for generating useful energy from vehicle motion of FIG. 5.

Given the inputs and outputs described with respect to FIG. 6, the ECU 74 may perform decision making, as illustrated, for example, by the flow chart of FIG. 7. First of all, the ECU 74 preferably receives information about all of the various energy generation rates, energy storage, and current operating conditions. If the rate of energy generation is sufficient (i.e., the rate of tiger pawls pivots, as detected by the first sensor 76) is above a preset lower limit, then the ECU 74 will turn off the backup DC motor 70 and actuate the first and second demand valves 56, 58 to operate the secondary fluid cylinder 30 with hydraulic fluid from the master fluid cylinder 24. This condition is an ideal, or so-called "steady-state" condition. In the steady-state condition, the ECU 74 will close the second demand valve 58 and actuate the first demand valve 56 to send hydraulic fluid to the secondary fluid cylinder 30. If the rate of energy generation exceeds a preset higher limit (i.e., there is excess energy), then the ECU 74 will close the second demand valve 58 and actuate the first demand valve 56 to send hydraulic fluid to both the storage tank 60 and the secondary fluid cylinder 30. Accordingly, when the rate of energy generation exceeds the preset higher limit, the ECU 74 will cause excess hydraulic fluid to be stored in the storage tank 60.

In the event that the rate of energy generation falls below the preset lower limit, there is a comparison between the storage tank 60 levels and the battery 72 levels. If the fluid level in the storage tank 60 falls below a preset volume limit, the ECU 74 will activate the backup DC motor 70 and close the second demand valve 58, in order to refill the storage tank 60 but maintain rotation of the flywheel 41, via the backup DC motor 70. If the level of charge in the battery 72 falls below a certain level, the ECU 74 will open the second demand valve 58 and turn off the backup DC motor 70, so as to actuate the secondary fluid cylinder 30 with the storage tank 60, and recharge the battery 72. If the ECU 74 is operating the system using the storage tank 60 or the backup DC motor 70, it also preferably operates the first demand valve to send hydraulic fluid to the storage tank 60, instead of to the master fluid cylinder 24. However, if the storage tank 60 levels are sufficient, of course the ECU 74 may operate the secondary fluid cylinder 30, and direct excess rotational energy to the battery 72 via the alternator 68.

As will be appreciated by one of skill in the art, the presently disclosed systems and methods could be incorporated into nationwide, decentralized source of energy. Thus, a plurality of these systems could be incorporated into a roadway or even a nationwide highway system, in any desired configuration. The systems could be installed in different areas of traffic flow, and operated relative to known traffic patterns so as to produce a steady flow of energy. For example, these systems could be disposed in locations where substantial amounts vehicle braking is expected (e.g., approaching toll plazas, off ramps, traffic lights, etc.) in order to capture otherwise wasted braking energy. In one embodiment, each system may constitute a roadside carport where motorists could pull off of the road, park, and recharge their hybrid or electric vehicles, using excess energy generated by the system. For example, each carport could include a plurality of concrete or composite posts, each post having an outlet or cord by which motorists could electrically connect their vehicles to the system.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A system for generating useful energy from vehicle motion, the system comprising:
   a projection projecting above a road surface, pivotably mounted to the road surface to be pushed downward against the bias of a spring, by a vehicle tire passing over an upper surface of the projection;
   a master fluid cylinder mechanically linked to the projection;
   a fluid transfer device connected to the master fluid cylinder;
   a secondary fluid cylinder, communicating with the master fluid cylinder via the fluid transfer device; and
   a lever configured to transfer motion from the secondary fluid cylinder to a flywheel shaft, said flywheel shaft having a distal end coupled to an electric generator.

2. The system of claim 1, wherein the upper surface of the projection is generally convex, such that it protrudes from the road surface near its center and aligns with the road surface around its perimeter.

3. The system of claim 1, wherein the lower surface of the projection is also connected to a shock absorber, compressibly mounted below the road surface.

4. The system of claim 1, wherein the secondary fluid cylinder, lever, flywheel shaft, and electric generator are located remotely from the projection, by the fluid transfer device, in an off-road box.

5. The system of claim 1, wherein the lever includes a rack configured to engage a small flywheel drive gear, which is integral with a large flywheel drive gear.

6. The system of claim 5, wherein the large flywheel drive gear is configured to engage a flywheel gear and pawl assembly such that flywheel pawls centrifugally engage and centrifugally disengage ratchet teeth, the ratchet teeth being integral with a flywheel on the flywheel shaft.

7. The system of claim 1, wherein the fluid transfer device comprises:
   a storage tank in communication with the master fluid cylinder and the secondary fluid cylinder, the storage tank including a safety valve for relieving excess internal fluid pressure;
   a first demand valve configured to selectively direct fluid from the master fluid cylinder to the secondary fluid cylinder and the storage tank; and
   a second demand valve configured to selectively direct fluid from the storage tank to the secondary fluid cylinder.

8. The system of claim 7, wherein the fluid transfer device further comprises a first hose connected between the master fluid cylinder and the first demand valve, a second hose connected between the first demand valve and the secondary fluid cylinder, a third hose connected between the first demand valve and the storage tank, a fourth hose connected between the storage tank and the second demand valve, and a fifth hose connected between the second demand valve and the secondary fluid cylinder.

9. The system of claim 7, wherein the first demand valve is a two-way valve configured to switch between a first fluid connection between the master fluid cylinder and the secondary fluid cylinder, and a second fluid connection between the master fluid cylinder and the storage tank.

10. The system of claim 7, wherein the first demand valve is a proportional valve configured to selectively direct any desired proportion of fluid from the master fluid cylinder between the secondary fluid cylinder and the storage tank.

11. The system of claim 7, further comprising:
   an alternator, configured to recover rotational energy of the flywheel shaft;
   a DC motor, configured to positively engage the flywheel shaft at selected times;
   a flywheel shaft sensor, configured to detect a rotational speed of the flywheel shaft;
   a gearbox disposed in-line with the flywheel shaft between the flywheel and the electric generator; and
   a gearbox shaft sensor disposed in-line with a gearbox shaft between the gearbox and the electric generator.

12. The system of claim 11, further comprising:
   a battery in communication with the alternator and the DC motor;
   an alternative energy system in communication with the battery; and
   an electric public grid meter in communication with the battery;
   wherein the battery is configured to store energy collected from the alternator and the alternative energy system so as to selectively power the DC motor.

13. The system of claim 12, wherein the alternative energy system includes at least one photovoltaic cell.

14. The system of claim 12, wherein the alternative energy system includes at least one wind-powered turbine configured to recover energy from air turbulence created by vehicles engaging the system.

15. The system of claim 12, further comprising:
   a first sensor configured to detect a rate of pivots of the projection;
   a second sensor configured to detect a level of fluid in the storage tank;
   a third sensor configured to detect a rate of rotation of the flywheel shaft; and
   a fourth sensor configured to detect a rate of rotation of the gearbox shaft.

16. The system of claim 15, further comprising an electronic control unit in communication with one or more of the first sensor, second sensor, third sensor, fourth sensor, first demand valve, second demand valve, gearbox, alternator, DC motor, battery, alternative energy system, and electric public grid meter.

17. The system of claim 16, wherein, when the rate of projection pivots detected by the first sensor exceeds a preset lower limit, the electronic control unit actuates the first and second demand valves to operate the secondary fluid cylinder with fluid from the master fluid cylinder.

18. The system of claim 16, wherein, when the rate of projection pivots detected by the first sensor exceeds a preset higher limit, the electronic control unit actuates the first and second demand valves to operate the secondary fluid cylinder with fluid from the master fluid cylinder, and to direct excess fluid flow to the storage tank.

19. The system of claim 16, wherein, when the rate of projection pivots detected by the first sensor falls below a preset lower limit, the electronic control unit actuates the first and second demand valves to operate the secondary fluid cylinder with fluid from the storage tank.

20. The system of claim 16, wherein, when the rate of projection pivots detected by the first sensor falls below a preset lower limit, and the fluid level in the storage tank detected by the second sensor falls below a preset volume limit, the electronic control unit actuates the DC motor.

21. The system of claim 1, wherein the electric generator is configured to provide electricity for recharging vehicles traveling along the road surface.

* * * * *